United States Patent
Schulze

(10) Patent No.: US 9,004,929 B2
(45) Date of Patent: Apr. 14, 2015

(54) MANUFACTURING METHOD FOR ELECTRIC COMPONENT AND ELECTRICAL COMPONENT

(75) Inventor: Claus Schulze, Bergen (DE)

(73) Assignee: MOTORTECH GmbH, Celle (DE)

(*) Notice: Subject to any disclaimer, the term of this patent is extended or adjusted under 35 U.S.C. 154(b) by 213 days.

(21) Appl. No.: 13/695,657

(22) PCT Filed: May 6, 2011

(86) PCT No.: PCT/DE2011/075101
§ 371 (c)(1),
(2), (4) Date: Nov. 1, 2012

(87) PCT Pub. No.: WO2012/022307
PCT Pub. Date: Feb. 23, 2012

(65) Prior Publication Data
US 2013/0052844 A1    Feb. 28, 2013

(30) Foreign Application Priority Data
May 11, 2010 (DE) .......................... 10 2010 016 881

(51) Int. Cl.
| | | |
|---|---|---|
| *H01R 13/44* | (2006.01) | |
| *H01T 13/05* | (2006.01) | |
| *H01R 24/38* | (2011.01) | |
| *B29C 45/16* | (2006.01) | |
| *H01T 21/02* | (2006.01) | |
| *B29C 45/14* | (2006.01) | |
| *B29C 45/34* | (2006.01) | |
| *B29K 81/00* | (2006.01) | |
| *B29K 105/12* | (2006.01) | |
| *B29L 31/34* | (2006.01) | |

(52) U.S. Cl.
CPC ............... *H01T 13/05* (2013.01); *H01R 24/38* (2013.01); *B29C 45/14639* (2013.01); *B29C 45/1671* (2013.01); *B29C 45/34* (2013.01); *B29C 2045/1673* (2013.01); *B29C 2791/006* (2013.01); *B29K 2081/04* (2013.01); *B29K 2105/12* (2013.01); *B29L 2031/34* (2013.01); *H01T 21/02* (2013.01)

(58) Field of Classification Search
CPC ......... H01T 13/05; H01T 21/02; B29C 41/50; B29C 45/34; H01R 24/38
USPC .................................. 439/125–127, 736, 936
See application file for complete search history.

(56) References Cited

U.S. PATENT DOCUMENTS

| | | |
|---|---|---|
| 2,399,402 A | 4/1946 | Spengler |
| 3,914,003 A | 10/1975 | Loy |
| 5,476,695 A | 12/1995 | Okada et al. |
| 6,982,622 B2 | 1/2006 | Takeyama et al. |

FOREIGN PATENT DOCUMENTS

| | | |
|---|---|---|
| DE | 10356742 A1 | 6/2004 |
| JP | 3046782 A | 2/1991 |

*Primary Examiner* — Khiem Nguyen
(74) *Attorney, Agent, or Firm* — Patent Central LLC; Stephan A. Pendorf

(57) ABSTRACT

A method for producing electric components (1) for high-voltage applications, in particular ignition systems. An insulator (3) is produced as a hollow body from a thermoplastic material by an injection-molding method, the electrical functional part (2) is introduced into the insulator (3), and a casting material is cast in the intermediate space between the electrical functional part (2) and the insulator (3). Also, an electric component (1) having an electrical functional part (2) and an insulator (3) for high-voltage applications, in particular ignition systems The insulator (3) preferably consists of polyphenylene sulfide having a glass fiber content.

19 Claims, 1 Drawing Sheet

MANUFACTURING METHOD FOR ELECTRIC COMPONENT AND ELECTRICAL COMPONENT

The invention relates to a manufacturing method for electric components for high voltage applications, in particular for ignition systems, which have at least one electrical functional component and an insulator, wherein said electrical functional component is disposed within the insulator.

The invention further relates to an electrical component with an electrical function part and insulator for high voltage applications, in particular ignition systems, wherein the insulator is a hollow body and the electrical functional element is inserted in the hollow body in a casting compound. The term "electrical functional part", is to be understood to mean, for example, an electrical conductor, an electrical resistor, an electrical circuit, etc., with the associated contacting means.

Electrical components for high voltage applications require a highly effective insulation. Electrical components for high-voltage applications of the type in interest here have at least one electrical functional part and an insulator surrounding the electrical functional part. The insulator is thus formed as a hollow body. Especially where there is little space for an insulator between the electrical functional part and the environment, high demands are made on the insulator. In order to ensure a high insulation quality of an insulator a proper manufacturing process is necessary. For ignition systems in which a high voltage is transmitted to the spark plug of the engine, in particular a gas engine, it is necessary to satisfy high insulation requirements under changing environmental conditions. Spark plugs and the ignition connectors are therefore often comprised of insulator-technical ceramics. Ceramic insulators, for example, aluminum oxide, are very brittle and therefore susceptible to impact stress. The smallest cracks in the insulator can lead to significant dysfunction that can lead to engine damage. Furthermore, technical ceramics labor consuming to manufacture and expensive.

Attempts have therefore been made to replace technical ceramics with plastics. As a suitable candidate plastic polytetrafluoroethylene (PTFE for short, also known under the trade name "Teflon®") became established and used, for example, for insulators in spark plug wire connectors. For the manufacture of PTFE insulators as a hollow body, usually round rod-shaped semi-finished products made of PTFE are used, which are then processed by means of machining of the desired hollow bodies into the form of the insulator. This treatment is relatively time consuming, requires significant investments in machinery and produced, in the machining process, large amounts of residues. Since PTFE is relatively expensive in a semi-manufactured form, and since usually only 40% or less of the purchased in semi-manufactured part remains following machining to manufacture the shape of the final product, the material costs contribute significantly to the final product cost in mass production. A further disadvantage is that, since PTFE is a very inert material, insulators and electric components can not be glued or cast in PTFE at a reasonable cost. To avoid this problem, for example, in a PTFE hollow insulator, in the area of electrical functional part to be inserted, a ceramic sleeve is pressed into the PTFE hollow body to then make it possible to glue the electrical functional part to the ceramic sleeve. This multi-step production process of different materials is very complicated and, due to the interconnected different materials, very problematic due to the influence of alternating ambient conditions.

DE 103 567 42 A1 discloses an ignition coil assembly, which is installed in a spark plug cavity component as so called integral sparkplug, wherein it forms together with the spark plug hole member an interior space, having a primary coil and a primary winding wire wound around the outer surface of the primary coil, wherein at least a part the outer surface of the primary coil is formed of a crystalline resin, which part is in fluid communication with the inner space. Since with this arrangement the primary windings and the primary winding carrier are unprotected in plug shaft plug and exposed to hot combustion gases, so-called "blow-by gases", it has been proposed to produce the winding support of a high-performance plastic, such as PPS. In particular, a primary coil with a slotted coil with exposed primary winding, at which the formation of the coil body made of PPS provides a longer service life, when it flows around the hot combustion gases. Further described in DE 42 103 567 A1, a secondary winding carrier of unreinforced plastic is described, which is installed partly embedded in the primary winding carrier made of PPS. This very special design is intended to increase the service life of such integral coils; however, suggestion for production of high-voltage components for low-cost mass production can not be derived from this publication.

The object of the invention is, in contrast, to provide a manufacturing method of an electrical component for high-voltage applications, as well as an electric component, that less expensive to manufacture than PTFE or ceramic components, and nevertheless has a very good high-voltage insulation and high durability.

This object is achieved with a method of manufacturing such a component in accordance with claim 1 and by an electrical component according to claim 4.

By use of a thermoplastic material, the insulator can be manufactured inexpensively as a hollow body in an injection molding process. In the injection molding method, only the quantity of material actually required for the hollow body molding is consumed, whereby the material requirement is reduced. Furthermore, with injection molding, machining is unnecessary. This results in significant cost advantages in mass production. In the thus produced hollow body, the electrical functional part can already be inserted (pre-assembled), in order to then be able to subsequently cast an insulating casting compound into the gap formed between the electrical functional part and a hollow body. The hollow body manufactured from thermoplastic has a good adhesiveness to various sealing compounds, so that the functional part inserted in the insulator is securely fixed via the casting compound, and no cracks, cavities or other similar defects are formed in the gap, which would reduce the high voltage resistance significantly and when subject to environmental influences, especially moisture, could lead to catastrophic failure. According to the device, the invention is achieved in that the insulator is made of polyphenylene sulfide with a glass fiber content. This plastic to be processed by injection-molding has a very high dielectric strength, which is more than 15 kV/mm, and in particular is more than 20 kV/mm. A glass fiber content of 30-50%, more preferably about 40% will cause the ideal mechanical properties of high tensile strength (about 180 MPa), an impact strength at 23° C. of 45 KJ/m or higher and a high thermal stability of temperatures of 230° C. and especially 260° C. A high dielectric strength sufficient even for the very high ignition gas engine ignition systems is achieved only by the optimum insulating properties, the crack-free processing and the void-free casting of the intermediate space between the insulator inserted electrical functional part and the inner wall of the insulator-hollow body.

To safely avoid even the smallest bubbles during casting of the intermediate space between the electrical functional part and the insulator, the casting takes place under vacuum, preferably at 50 to 1 mbar, particularly preferably 30 to 10 mbar. The dielectric strength and in particular the life of such manufactured electrical components is greatly enhanced by the casting under vacuum. A vacuum starting at 50 mbar is sufficient. Tests have shown that, from a vacuum of 30 mbar to 10 mbar mass production without producing bubbles in the hardened casting material can be achieved in controlled manner with great certainty. A stronger vacuum improves the properties then only marginally. In contrast, the expected energy expenditure and thus the cost would increase disporportionately.

The casting or sealing compound may be composed of a polyurethane resin or an epoxy resin. Both resins allow a strong fixation of the electrical function partly in the insulator and prevent, with suitable injecting, the formation of cracks, blisters or other defects that could lead to an electrical breakdown of the electrical component in high voltage applications.

To meet the required electrical and mechanical requirements for such an assembled electrical component, the casting or sealing compound has a density of at least 1.5 g/cm$^3$, in particular 1.7 g/cm$^3$.

In order to prevent overheating of the electrical component, in particular in the application as a spark plug connector, the casting or sealing compound has a heat conductivity of 0.6 W/mK, in particular 0.65 W/mK or higher. Thus the heat introduced from the motor via the spark plug is conducted to the outside in a sufficient amount, so that overheating of the electrical component, and in particular of the sealing compound, is prevented. However, the sealing compound is temperature resistant to 150° C., especially to 180° C. (temperature class H).

In order to safely provide the high voltage stability at the usual changing and often very humid conditions, the grout has a low water absorption, less than 0.1% in both a 10-day test at 23° C. as well as at a 30-minute test at 100° C.

In the following two embodiments of the invention are described in greater detail with reference to the accompanying drawing.

Figure 1:
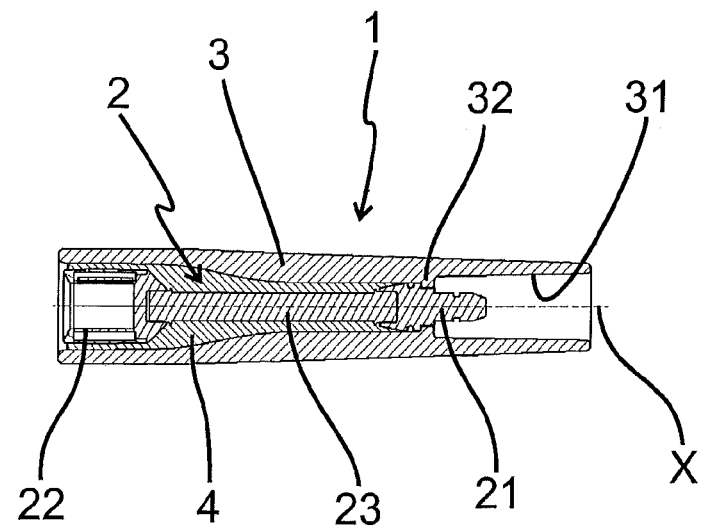
FIG. 1 shows a longitudinal section through a spark plug connector insert.

FIG. 1 shows an electrical component 1 for ignition systems, namely, a spark plug connector insert in a longitudinal section. The spark plug connector insert 1 is inserted into an outer shell made of plastic, for example PTFE, and forms, together with this envelope, spark plug connector. The spark plug connector insert 1 is rotationally symmetrical about the dashed axis X in FIG. 1. Inside the spark plug connector insert 1 an electrical functional part 2 is arranged. The electrical functional part 2 in this application example has a plug-shaped contacting element 21 at one end and a sleeve-like contact element 22 at the other end and resistor 23 arranged between the two contacting elements 21, 22.

Further, the spark plug connector insert 1 comprises an insulator 3 which is substantially formed as a hollow cylindrical body. The insulator 3 is made of a thermoplastic material, in particular polyphenylene sulfide with glass fiber, which has been produced by injection molding.

In one end of a hollow cavity 31 extending along the longitudinal axis X through the insulator 3, in the left side in FIG. 1, the electrical function part 2 is inserted. Here, the electrical functioning portion 2 is inserted with its plug-type defined consolidated contacting element 21 at an inner flange-like projection 32 of the insulator 3. Moreover, an intermediate space formed between the electrical function part 2 inserted into the insulator 3 and the insulator 3, is sealed with a sealing compound 4 free of blisters and cracks. The casting compound 4 is a high-voltage resistant epoxy resin, which is preferably introduced into the intermediate space under a vacuum of 30-10 mbar.

Figure 2:
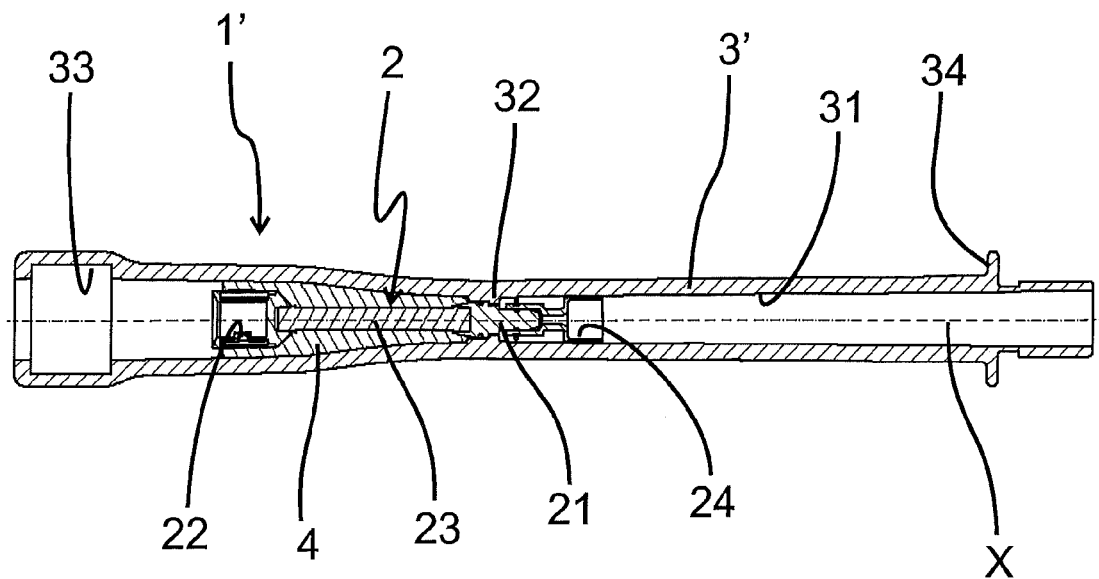
FIG. 2 shows a longitudinal section through a spark plug connector.

In FIG. 2, in a preferred embodiment, a spark plug connector is shown having an injection molded elongated insulator 3' which already represents the complete outer shape of the spark plug connector 1'. Components functionally identical to the components of the embodiment of a spark plug insert 1 described in FIG. 1 are here in FIG. 2 in the spark plug connector 1' denoted by the same reference numerals. The elongated insulator 3' is also provided as a hollow body with a continuous cavity 31. A flange projection 32 is formed narrowing the continuous cavity 31, which receives and fixes the electrical functional part 2, as described for FIG. 1. Here, the electrical functional part 2, consisting of plug-like contacting element 21, sleeve-like contacting element 22, and the two contact elements 21 and 22 connecting resistor 23 are inserted from the left in the drawing plane in FIG. 2 in the elongated insulator 3' in its through-going cavity 31 up to the flange-like projection 32, via which the plug-like contact element 21 is held. The gap between the electrical part 2 and the insulator 3' is then filled by casting the casting compound 4, for example an epoxy resin, preferably under vacuum.

In contrast to the spark plug connector 1 according to FIG. 1, the elongated insulator 3' in FIG. 2 has already on the left side an extension, which serves as a spark plug receptacle 33. The spark plug receptacle 33 encloses the top of the head of the spark plug, and serves as a guide and electrical insulation. At the other end of the elongated insulator 3' an elongated spark plug shaft 34 is shown in which a non-illustrated ignition wire is received secured against damage. At the plug-like contact element 21 of the electrical functional part 2 in FIG. 2 an ignition wire contacting element 24 is shown, which is associated with the non-illustrated ignition cable.

The advantage of the embodiment of FIG. 2 is that the entire spark plug is in the elongated insulator 3' formed along its outer boundary which receives simultaneously inside the electrical functional part 2 and leads and thereby provides the necessary electrical insulation. Furthermore, the plastic used for the insulator 3', namely preferably polyphenylene sulfide with fiberglass has, in addition to the ability high withstand voltage of preferably 25 kV/mm, a high mechanical strength and heat resistance. The spark plug connector is particularly suitable for use in gas engines, which require a very high ignition voltage and thus require the dielectric strength to be implemented.

In manufacture, substantial costs can be saved, since the spark plug cover shaped elongated insulator 3' of glass fiber reinforced polyphenylene sulfide can be injection-produced inexpensively, subsequently fitted with the electrical functional part 2 and then can be sealed with the casting or sealing compound, whereby only a three step procedure for manufacture of the spark plug is required.

REFERENCE LIST 1, 1' electrical component, spark plug connector insert, spark plug connector
2 electrical function part
21 plug-like contact-element
22 sleeve-like contact element
23 resistor
24 ignition wire contacting element 3, 3' insulator
31 continuous cavity
32 flange-like projection
33 spark plug receptacle
34 spark plug stem
4 casting or sealing compound
X longitudinal axis

The invention claimed is:

1. A method for manufacturing electric components (1) for high-voltage applications, with at least one electrical functional part (2) and an insulator (3), in which the electrical functional part (2) is arranged within the insulator (3), comprising the steps:
   a) forming the insulator (3) as a hollow body of a thermoplastic material by injection molding,
   b) inserting the electrical functional part (2) in the insulator (3),
   c) casting a casting material into the gap formed between the electrical functional part (2) and the insulator (3) formed as a hollow body, wherein the casting is carried out under vacuum.

2. The method for manufacturing according to claim 1, wherein fiberglass fibers are added to the thermoplastic in an amount by volume of 30 to 50%.

3. The method for manufacturing according to claim 1, wherein the casting material is a casting compound (4), and wherein the insulator (3) is comprised of polyphenylene sulfide with a glass fiber component.

4. The method according to claim 3, wherein the casting compound (4) is epoxy resin or polyurethane.

5. The method according to claim 3, wherein the casting compound (4) has a dielectric strength of 15 kV/mm or higher.

6. The method according to claim 3, wherein the casting compound (4) has a density of at least 1.5 g/cm$^3$.

7. The method according to claim 3, wherein the casting compound (4) has a thermal conductivity of 0.6 W/mK or higher.

8. The method according to claim 3, wherein the casting compound (4) is temperature resistant to 150° C.

9. The method according to claim 3, wherein the casting compound (4) has a water absorption which is below 0.1% in both the 10-day test at 23° C. as well as the 30-minute test at 100° C.

10. The method for manufacturing according to claim 1, wherein the casting is carried out under vacuum at 50 to 1 mbar.

11. The method for manufacturing according to claim 1, wherein the casting is carried out under vacuum at 30 to 10 mbar.

12. The method according to claim 4, wherein the casting compound (4) has a dielectric strength of 20 kV/mm or higher.

13. The method according to claim 4, wherein the casting compound (4) has a dielectric strength of 25 kV/mm or higher.

14. The method according to claim 3, wherein the casting compound (4) has a density of at least 1.7 g/cm$^3$.

15. The method according to claim 3, wherein the casting compound (4) has a thermal conductivity of 0.65 W/mK or higher.

16. The method according to claim 3, wherein the casting compound (4) is temperature resistant to 180° C. (temperature class H).

17. The method for manufacturing according to claim 3, wherein the glass fiber is added to the polyphenylene sulfide in an amount by volume of 30 to 50%.

18. A method for manufacturing electric components (1) for high-voltage applications, with at least one electrical functional part (2) and an insulator (3), in which the electrical functional part (2) is arranged within the insulator (3), comprising the steps:
   a) forming the insulator (3) as a hollow body of a thermoplastic material by injection molding,
   b) inserting the electrical functional part (2) in the insulator (3),
   c) casting a casting material composed of a polyurethane resin or an epoxy resin into the gap formed between the electrical functional part (2) and the insulator (3) formed as a hollow body, wherein the casting is carried out under vacuum at 50 to 1 mbar.

19. The method for manufacturing according to claim 18, wherein the casting is carried out under vacuum at 30 to 10 mbar.

* * * * *